United States Patent [19]

Schneider, Jr.

[11] 4,134,181
[45] Jan. 16, 1979

[54] APPARATUS FOR TRIMMING MEAT

[76] Inventor: Palmer W. Schneider, Jr., 2002 3rd Ave. SE., Austin, Minn.

[21] Appl. No.: 847,704

[22] Filed: Nov. 2, 1977

Related U.S. Application Data

[63] Continuation-in-part of Ser. No. 673,905, Apr. 6, 1976, abandoned.

[51] Int. Cl.² .......................................... A22C 17/04
[52] U.S. Cl. .................................................. 17/1 R
[58] Field of Search .................. 17/1 R, 24, 52, 1 G, 17/46

[56] References Cited

U.S. PATENT DOCUMENTS

| | | | |
|---|---|---|---|
| Re. 27,873 | 1/1974 | Weits et al. | 17/46 X |
| Re. 28,508 | 8/1975 | Neebel et al. | 17/1 G |
| 2,577,686 | 12/1951 | Hunt | 17/57 X |
| 2,822,569 | 2/1958 | Gradoff et al. | 17/56 |
| 2,857,621 | 10/1958 | Schlichting | 17/46 |
| 2,897,536 | 8/1959 | Bergstrom et al. | 17/46 X |
| 3,303,526 | 2/1967 | La Pine et al. | 17/57 |
| 3,639,945 | 2/1972 | Duncan et al. | 17/52 X |
| 3,665,557 | 5/1972 | Uekusa | 17/52 X |
| 3,670,363 | 6/1972 | Hogan et al. | 17/52.8 |
| 3,789,456 | 2/1974 | Doerfer et al. | 17/1 R |
| 3,816,875 | 6/1974 | Duncan et al. | 17/52 |
| 3,816,876 | 6/1974 | Barrette, Jr. | 17/52 X |
| 3,908,230 | 9/1975 | Hartmann | 17/46 X |
| 3,943,600 | 2/1976 | Cramer | 17/52 X |
| 3,947,920 | 4/1976 | Voornas | 17/1 G |
| 3,982,299 | 9/1976 | Kompan | 17/1 R |

*Primary Examiner*—Willie G. Abercrombie
*Attorney, Agent, or Firm*—Frederick W. Niebuhr

[57] ABSTRACT

A meat trimming apparatus includes an elongated table having an upwardly concave surface adapted to support a loin of meat by engaging a convex outer surface thereof. A guide spaced transversely from one edge of the table supports the loin against movement transversely of the table. A motor driven endless chain, also spaced transversely from the table, carries a plurality of pusher arms each of which is adapted to engage the loin and slidably move the same over the length of the table. Three rotary saws are selectively positionable with respect to the table whereby, upon movement of the loin over the length of the table, the first saw severs an eye of the loin from a backbone thereof, the second saw severs ribs of the loin from the backbone, and the third saw severs a round portion of the backbone from the remainder thereof.

5 Claims, 6 Drawing Figures

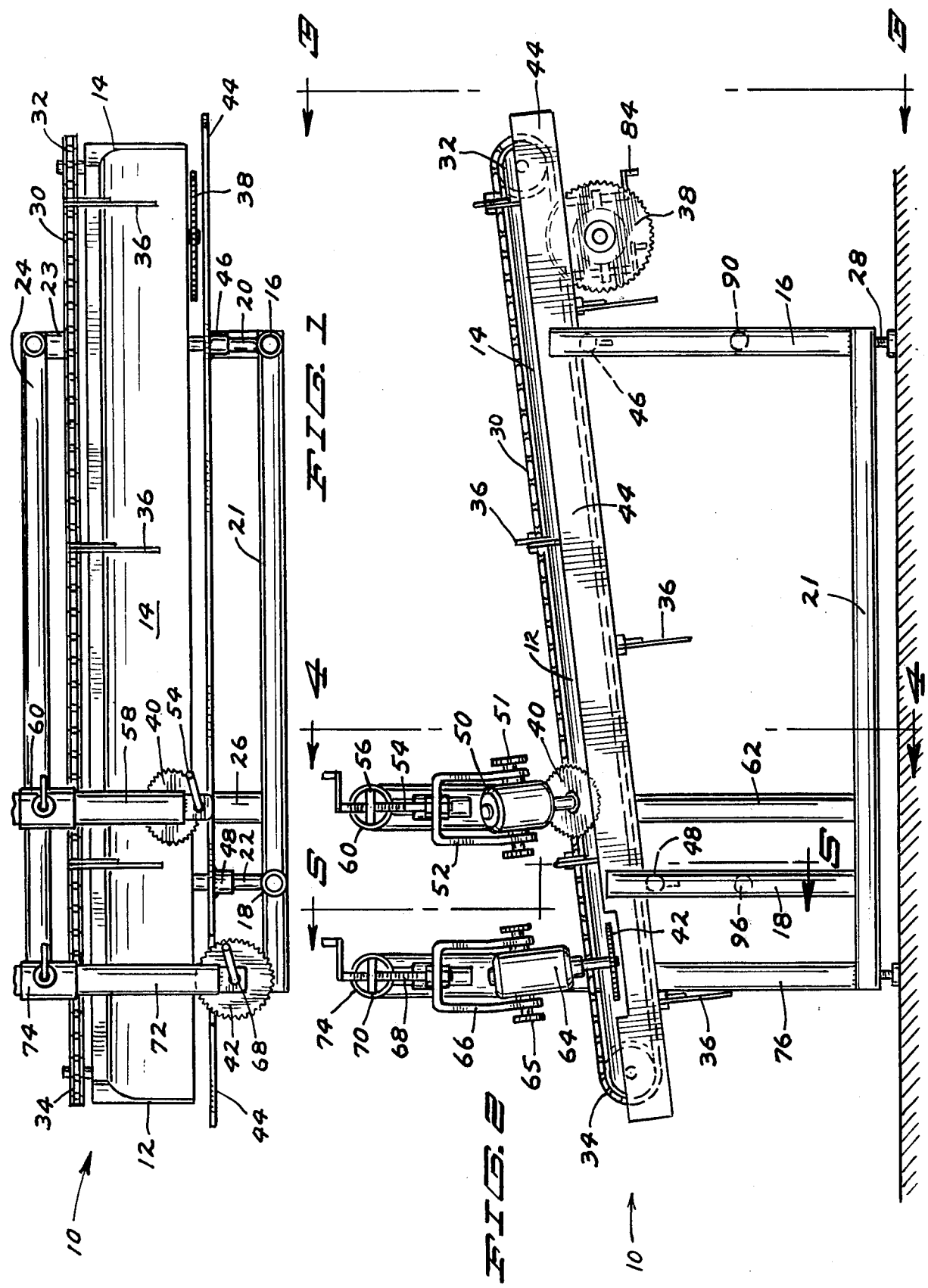

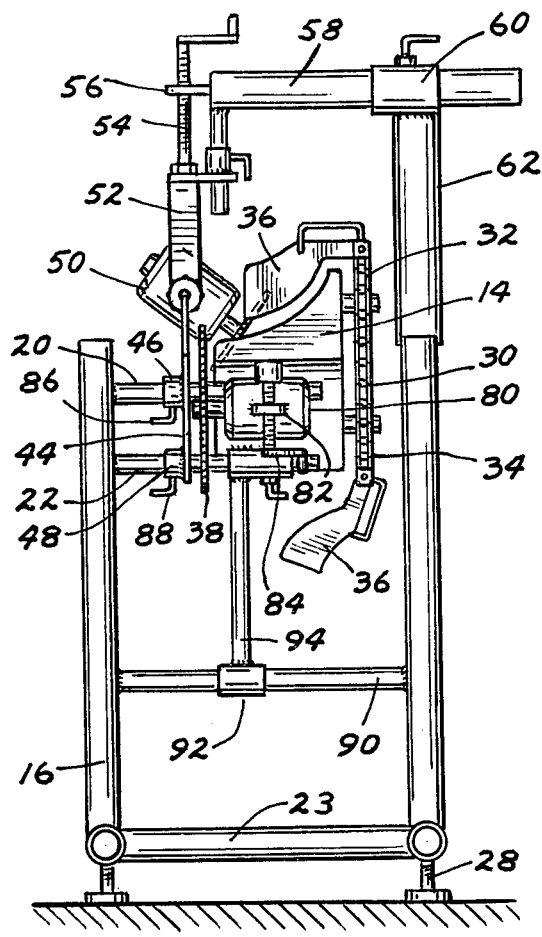
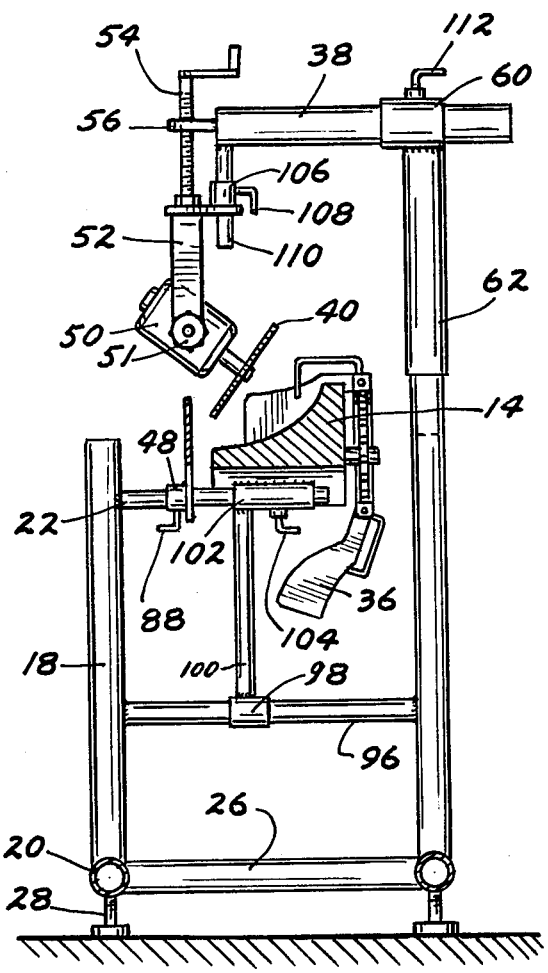
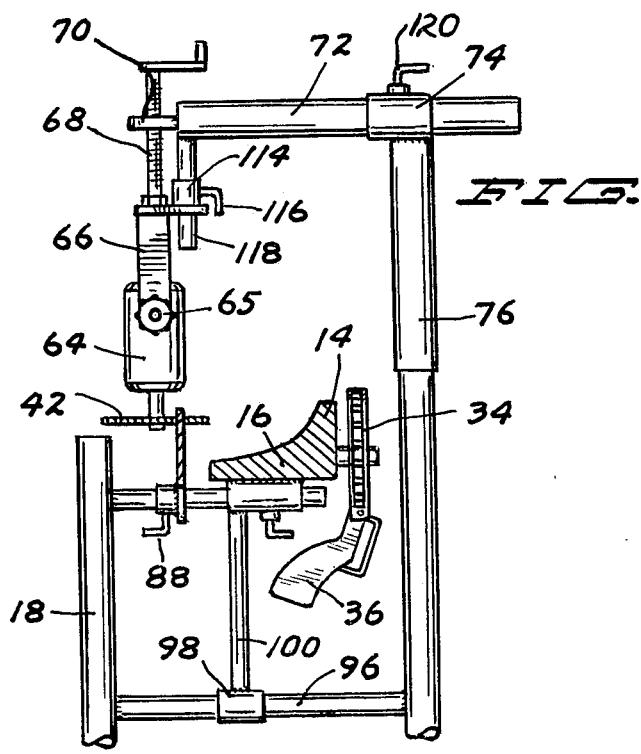
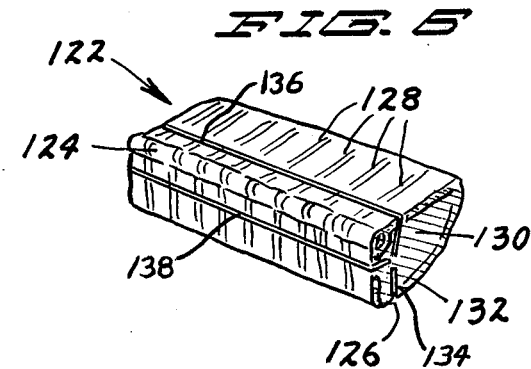

APPARATUS FOR TRIMMING MEAT

CROSS REFERENCE TO RELATED APPLICATION

This application is a continuation-in-part of Application Ser. No. 673,905 filed Apr. 6, 1976 now abandoned.

BACKGROUND OF THE INVENTION

Prior to processing, a loin of meat is a heavy, elongated piece generally uniform in transverse cross section. The loin has a backbone longitudinally thereof including a cylindrical spine and a backbone extension which protrudes radially outward from the spine. A plurality of ribs are attached to the spine in a spaced apart relation and extend from the spine transversely of the loin and generally perpendicular to the backbone extension. An eye or tenderloin of meat lies between the backbone and ribs and is connected thereto. That part of the eye farthest from the spine forms a convex outer loin surface which is generally uniform in transverse cross section over the length of the loin.

Commercial processing of the loin includes its deboning, or removal of the spine and backbone extension from the tenderloin and ribs. The meat is then ready for transverse cutting into retail units, for example pork chops in the case of a pork loin. The de-boning process is time consuming and potentially dangerous to the operator involved. Frequently the operator uses a hand saw in making the necessary cuts. Alternately, the cuts may be accomplished using band saws. However, the operator is still required to guide the meat past the saws by hand.

SUMMARY OF THE INVENTION

The invention relates to an apparatus for trimming or de-boning a loin of meat, permitting fast and efficient processing of the loin while insuring safety to the operator.

The apparatus includes an elongated table having an upwardly concave meat supporting surface generally uniform in cross section transversely of the table. The concave surface is so contoured as to fit snugly against a substantial portion of the convex outer surface of the loin, when the loin is longitudinally aligned with and resting upon the table. An elongated guide is mounted with respect to the table and, as shown, can comprise a flat panel spaced a uniform transverse distance from the lower longitudinal edge of the concave table surface. With the convex loin surface resting on the table and the backbone extension of the loin abutting the guide, the loin is placed in a selected longitudinal orientation with respect to the table and is prevented from moving transversely out of orientation.

A first means, for example herein a rotary power saw, is provided for cutting in a first plane longitudinally of the table. As shown, the rotary saw can be mounted principally beneath the table with a rotary blade parallel to the guide and extended at least partially above the concave surface. A second means is supplied for cutting in a plane longitudinally of the table and forming an acute angle with the first plane. Such second means as shown is a radial arm saw mounted above the table. A third means cuts in a third plane longitudinally of the table and perpendicular to the first plane. The third means shown is a second radial arm saw, also mounted above the table.

Positioning means selectively locate the cutting means with respect to the table. As shown, the rotary saw is adjustable both vertically and horizontally transversely of the table. Each of the radial arm saws is similarly adjustable, and further adjustable angularly relative to its supporting bracket. That is, each of the second and third cutting planes is effectively pivotable on an axis running longitudinally of the table.

With the cutting means properly positioned and operating, the loin is moved longitudinally on the table and past the cutting means while in the selected orientation relative to the table. The following cuts are thereby accomplished: The first means effects a cut generally parallel to and adjacent the backbone extension to sever it from the eye of the loin. The second means cuts the ribs, severing each at its point of joinder to the spine. The third means cuts the backbone extension to sever it near its connection with the spine.

As shown, an endless chain can be provided longitudinally of the table and slightly transversely spaced therefrom. The chain carries a plurality of pusher arms or plates, each adapted to engage the loin and push the same slidably over the table and past the cutting means.

Thus, the operator need only "load" the apparatus by placing the loin upon the table at least approximate to the selected longitudinal orientation. The necessary cuts are accomplished without any further operator intervention, greatly reducing the possibility of operator injury. Because of the increased safety, and also because the operator need not guide the loin but only position it initially, the speed at which loins of meat are de-boned can be significantly increased.

IN THE DRAWINGS

FIG. 1 is a top plan view of a meat trimming apparatus in accordance with the invention;

FIG. 2 is a side elevation of the meat trimming apparatus;

FIG. 3 is an end view of the meat trimming apparatus taken along the line 3—3 in FIG. 2;

FIG. 4 is a sectional view taken along the line 4—4 in FIG. 2;

FIG. 5 is a sectional view taken along the line 5—5 in FIG. 2; and

FIG. 6 is a perspective view of a loin of pork showing a plurality of cuts effected by the apparatus.

DESCRIPTION OF PREFERRED EMBODIMENT

Referring to the drawings, there is shown a meat trimming apparatus 10 including an elongated table 12 of substantially uniform transverse cross section. Table 12 is provided with an upwardly concave surface 14 particularly well adapted for supporting a loin of meat as hereinafter explained. The table is mounted with respect to a forward leg 16 and a rearward leg 18 through a forward transverse shaft 20 and a rearward transverse shaft 22, respectively. Due to the longer length of leg 16 as compared to leg 18, table 12 can be inclined downwardly and rearward as shown to facilitate movement of a loin of meat over the table. Such movement can be further facilitated by providing a modest but continuous supply of water at the forward end to lubricate the path traversed by the loin. Legs 16 and 18 are mounted at the bottom to a main frame including a first longitudinal brace 21, a forward transverse brace 23, a second longitudinal brace 24 and a rearward transverse brace 26. Four substantially identical feet 28 threadedly engage the main frame and are adjustable relative thereto for transverse leveling of the table. If mobility is desired, feet 28 can readily be replaced with caster wheels or the like.

An endless chain 30 is mounted along table 12, longitudinally thereof and spaced transversely therefrom a sufficient distance to allow it to move relative to the table. A forward sprocket 32 and a rearward sprocket 34 mutually support the chain. Chain 30 is driven at a constant speed in the counterclockwise direction as viewed in FIG. 2, preferably by an electric motor drivably associated with either of sprockets 32 and 34 via gears, a V-belt or a common drive shaft. As means for driving chain 30 are within the province of those skilled in the art, they are not described in detail nor shown in the drawings. A plurality of pusher arms or plates 36, mounted on chain 30, follow its rotational path. Each plate 36 is adapted to engage the rearward end of a loin placed upon the table and to slidably move the loin over the length of table 12. While it is recognized that sufficient tipping of table 12 could move a loin by gravity, the preferred method is by use of chain 30.

Means are provided for effecting three separate cuts upon the loin as it traverses the length of the table. A rotary saw mounted near the forward end of table 12 has a first rotary blade 38 disposed to cut in a plane longitudinally of the table. Rearwardly of the rotary saw is a first radial arm saw carrying a second rotary blade 40 for cutting in a plane longitudinally aligned with table 12 and forming an acute angle in its intersection with the plane of first blade 38. Behind the first radial arm saw is a second radial arm saw which carries a third rotary blade 42 disposed to cut in a plane longitudinally of the table and perpendicular to the plane of first blade 38.

An elongated guide or panel 44 is mounted longitudinally with respect to the table and slightly transverse thereof. Panel 44 is adapted to abut a loin supported on table 12 and thereby prevent movement of the loin transversely of table 12. The panel is mounted slidably on transverse shafts 20 and 22 through a forward collar 46 and a rearward collar 48, respectively. Panel 44 is thus movable to adjustably support a loin.

The support and operation of rotary blade 38 is best seen in FIG. 3 and is described in connection therewith. As seen in FIG. 2, second blade 40 is connected through a drive shaft to an electric motor 50. By means of adjustable knobs at 51, motor 50 is pivotable with respect to a supporting bracket 52 about an axis passing through the knobs and longitudinally aligned with table 12. Knobs 51 are tightenable to fix the angular position of motor 50, and thus blade 40, at any number of angular orientations. In this manner the cutting angle of blade 40 is adjustable. The lower ends of bracket 52 are bent in order to align the pivot axis with the inclination of table 12. Supporting the bracket is a crank 54 threadedly engaged with a lug 56 through an opening therein. Rotation of crank 54 can raise or lower it, along with bracket 52, relative to lug 56, thereby permitting adjustment in the height of blade 40. Lug 56 is rigidly mounted to a support arm 58 which in turn is mounted in a support collar 60 attached rigidly to a support leg 60. Leg 60 is mounted to the main frame at second longitudinal brace 24.

Third rotary blade 42 is drivably connected to an electric motor 64 by a drive shaft. Blade 42 is supported and positioned selectively with respect to table 12 in an equivalent manner using substantially equivalent parts. These parts, in addition to motor 64, are: a bracket 66, knobs 65, a crank 68, a lug 70, a support arm 72, a support collar 74 and a support arm 76. The principal difference is that third blade 42, while cutting longitudinally of table 12, is oriented perpendicuarly with respect to first blade 38. It is noted that knobs 65 permit adjustment of blade 42 to an acute angular relation relative to the first blade if desired.

In FIG. 3 it is seen that first blade 38, through a shaft, is drivably associated with an electric motor 80 mounted under table 12. A motor lug 82 threadedly engages a forward motor crank 84 which is rotatable to adjust the height of motor 80 relative to table 12. Directly behind motor 80 and thus not visible in the figure are a lug and crank equivalent to lug 82. While the two cranks may be adjusted in tandem to some extent, simultaneous adjustment is preferred. When each plate 36 is in working position over table 12, its bottom edge is contoured to match concave surface 14. Below the table, each plate pivots out of working position as shown. Means for positioning panel 44 transversely of table 12 include a forward locking pin 86 threadedly engaging forward collar 46, and a rearward locking pin 88 so engaging collar 48. With pins 86 and 88 at least partially withdrawn, collars 46 and 48 are slidable on shafts 20 and 22. Tightening of the locking pins secures the collars and thus rigidly positions panel 44.

Table 12 is also mounted adjustably on shafts 20 and 22. A forward transverse beam 90 lends added support to shaft 20. A collar 92, slidable over the beam, supports an upright 94, the upper end of which is joined to an elongated collar welded to table 12 and slidable on shaft 20. The elongated collar is behind motor 80. As seen in FIG. 4, a rear transverse beam 96 supports, via a slidable collar 98, an upright 100. An elongated collar 102 is welded to upright 100 and to the underside of table 12. A locking pin 104 can be tightened to fix the position of the table. When pin 104 is not tight, collars 98 and 102 can slide simultaneously on beam 96 and shaft 22, respectively.

Provision for fixing the vertical position of second rotary blade 40 includes a locking collar 106, a locking pin 108 and a rod 110. Collar 106 slides upon the rod as crank 54 is turned, then is locked into position on the rod when pin 108 is tightened. The location of blade 40 transversely of table 12 can be varied by sliding support arm 58 within collar 60. A top locking pin 112 can be tightened to fix the arm with respect to collar 60.

Note that third rotary blade 42 and motor 64 would ordinarily be visible in the views depicted in FIGS. 3 and 4. For clarity in illustration, they are not drawn in these figures, and are to be seen in FIG. 5. The vertical position of third blade 42 can be adjusted in a manner similar to that used to adjust blade 40. A locking collar 114, through the tightening of a locking pin 116, can be fixed to a rod 118 once crank 68 has been turned the desired amount. Transverse position of blade 42 is accomplished by sliding support arm 72 relative to collar 74, then tightening a top locking pin 120.

FIG. 6 shows a section of a pork loin 122. Loin 122 is an elongated piece having a backbone which is longitudinally disposed thereof. The backbone includes a spine 124, generally circular in transverse cross section, and a backbone extension 126 below the spine and protruding radially outward therefrom. Loin 122 further includes a plurality of ribs 128, each rib connected to spine 124 and extended outward the spine transversely of the loin and approximately normal to extension 126. A tenderloin or eye of meat 130 is situated between and is joined to the backbone and ribs. Eye 130 is shaped to form an outer surface 132 of meat or fat opposite the spine. Surface 132 is convex and generally uniform in transverse cross section over the length of loin 122.

Prior to trimming loin 122, apparatus 10 is properly adjusted by selectively positioning rotary blades 38, 40 and 42 using the means described above. Panel 44 is also set relative to table 12. Because of the contour of concave surface 14, there will be substantial contact between it and outer surface 132 when loin 122 is placed on table 12 in longitudinal alignment therewith, and with extension 126 vertically disposed and facing panel 44. The curvature of surface 14 initially causes transverse sliding of loin 122 on table 12, but only until spine 124 and extension 126 are flush with panel 44. Thus resting against surface 14 and panel 44, loin 122 is in a preferred or selected longitudinal orientation with respect to table 12.

With blades 38, 40 and 42 and chain 30 operating, loin 122 is placed upon the table and quickly slides into the selected orientation. The first plate 36 behind the loin engages the loin, slidably moving the same over the table and past the blades. Preferably, the panel is set such that when its inside vertical face abuts the backbone of loin 122, first blade 38 cuts into the loin vertically and adjacent to extension 126. This cut is shown at 134. Second blade 40, when properly positioned, effects a second cut 136. A cut 138 is accomplished by third blade 42.

While the above order of cutting is a preferred embodiment, an alternative order could be chosen without departing from the invention. For example, the cut performed by second rotary blade 40 could follow the cut of third blade 42. Within the confines of the apparatus shown, such change is effected by interchanging the angular positions of the two blades. Regardless of the order of cutting, however, the invention performs cutting and guiding operations heretofore requiring hand labor, and thereby enhances the safety as well as the speed of meat processing.

The embodiments of the invention in which an exclusive property or privilege is claimed are defined as follows:

1. An apparatus for trimming an elongated loin of meat having a longitudinally disposed backbone including a generally cylindrical spine and a backbone extension protruding from the spine transversely thereof, a plurality of ribs extended from the spine transversely thereof and generally perpendicular to the backbone extension, and an eye of meat joined between the extension and ribs and forming a convex outer surface longitudinally of the loin; said apparatus including:

an elongated table having an upwardly concave surface longitudinally thereof and contoured for substantial surface engagement with said convex surface of the loin to support the loin in longitudinal alignment with the table;

an elongated guide mounted with respect to the table and adapted to abut said backbone extension when said concave and convex surfaces are engaged, preventing substantial movement of the loin transversely of the table thereby maintaining the loin in a selected longitudinal orientation relative to the table;

first means for cutting in a first plane longitudinally of the table, second means for cutting in a second plane longitudinally of the table and in acute angular relation to said first plane, and third means for cutting in a third plane longitudinally of the table and generally perpendicular to said first plane;

positioning means for selectively locating said first, second and third means with respect to the table whereby, when said loin is moved longitudinally on the table past the first, second and third means and while in said selected longitudinal orientation, the first means severs said eye from said backbone extension, the second means severs said ribs from said spine, and the third means severs said extension from said spine.

2. The apparatus of claim 1 wherein:
said table and guide are fixed relative to said first, second and third means, and said loin is moved longitudinally on the table slidably thereon.

3. The apparatus of claim 2 including:
an endless chain mounted proximate the table for movement longitudinally thereof, said chain carrying at least one pusher arm adapted to engage a rearward end of the loin and, with the chain moving, slide the loin over the length of the table.

4. The apparatus of claim 2 wherein:
said guide is disposed longitudinally of the table and adjustilby spaced transversely thereof, and said loin, when on the concave surface, is urged against the guide by gravity.

5. The apparatus of claim 4 wherein:
the table is inclined downwardly from a forward end to a rearward end thereof.

* * * * *